Aug. 17, 1926.
I. E. COLEMAN
1,596,080
ELECTRIC TOASTING DEVICE
Filed August 17, 1925  2 Sheets-Sheet 1
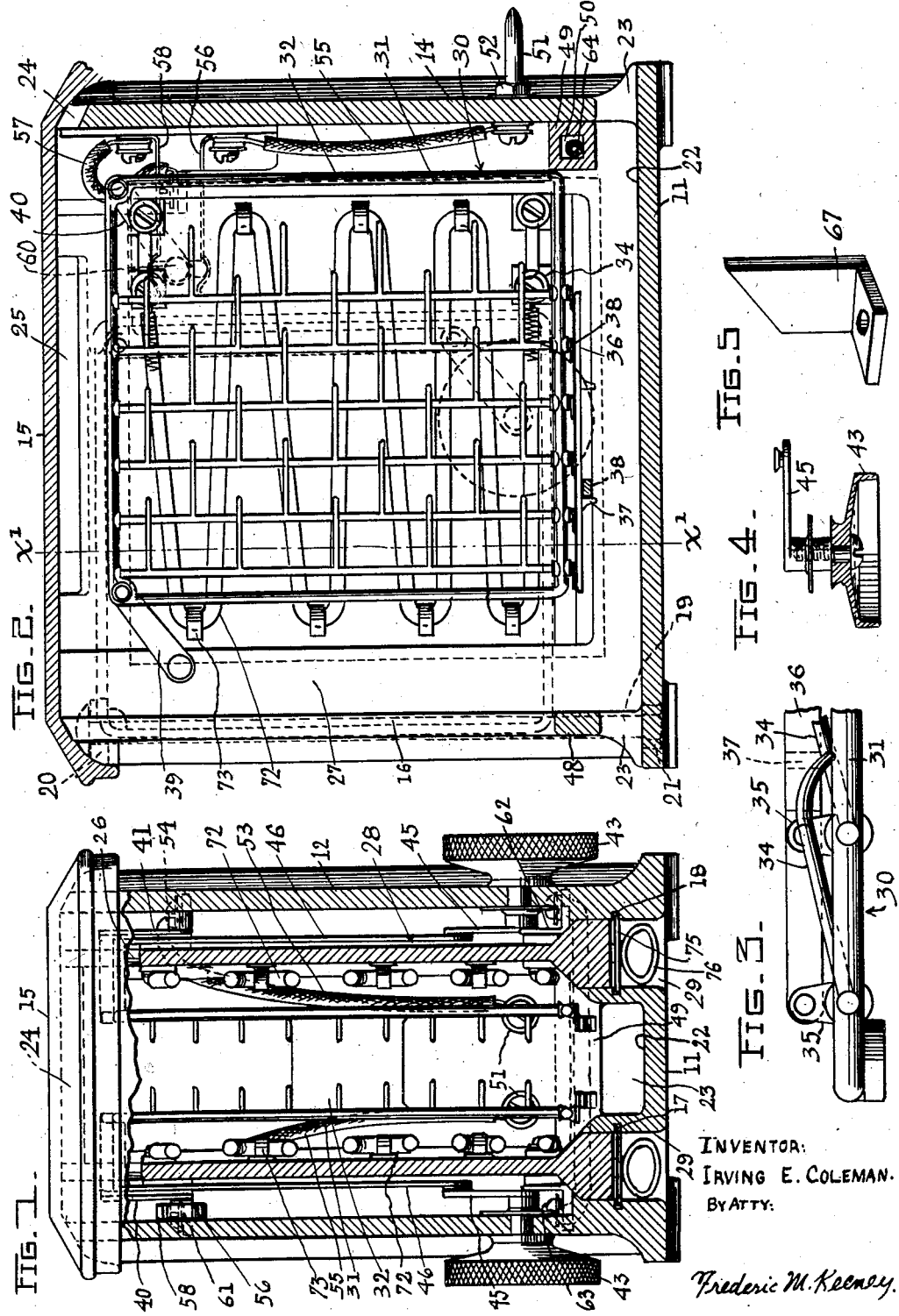
INVENTOR:
IRVING E. COLEMAN.
BY ATTY:
Frederic M. Keeney.

Aug. 17, 1926.
I. E. COLEMAN
1,596,080
ELECTRIC TOASTING DEVICE
Filed August 17, 1925    2 Sheets-Sheet 2
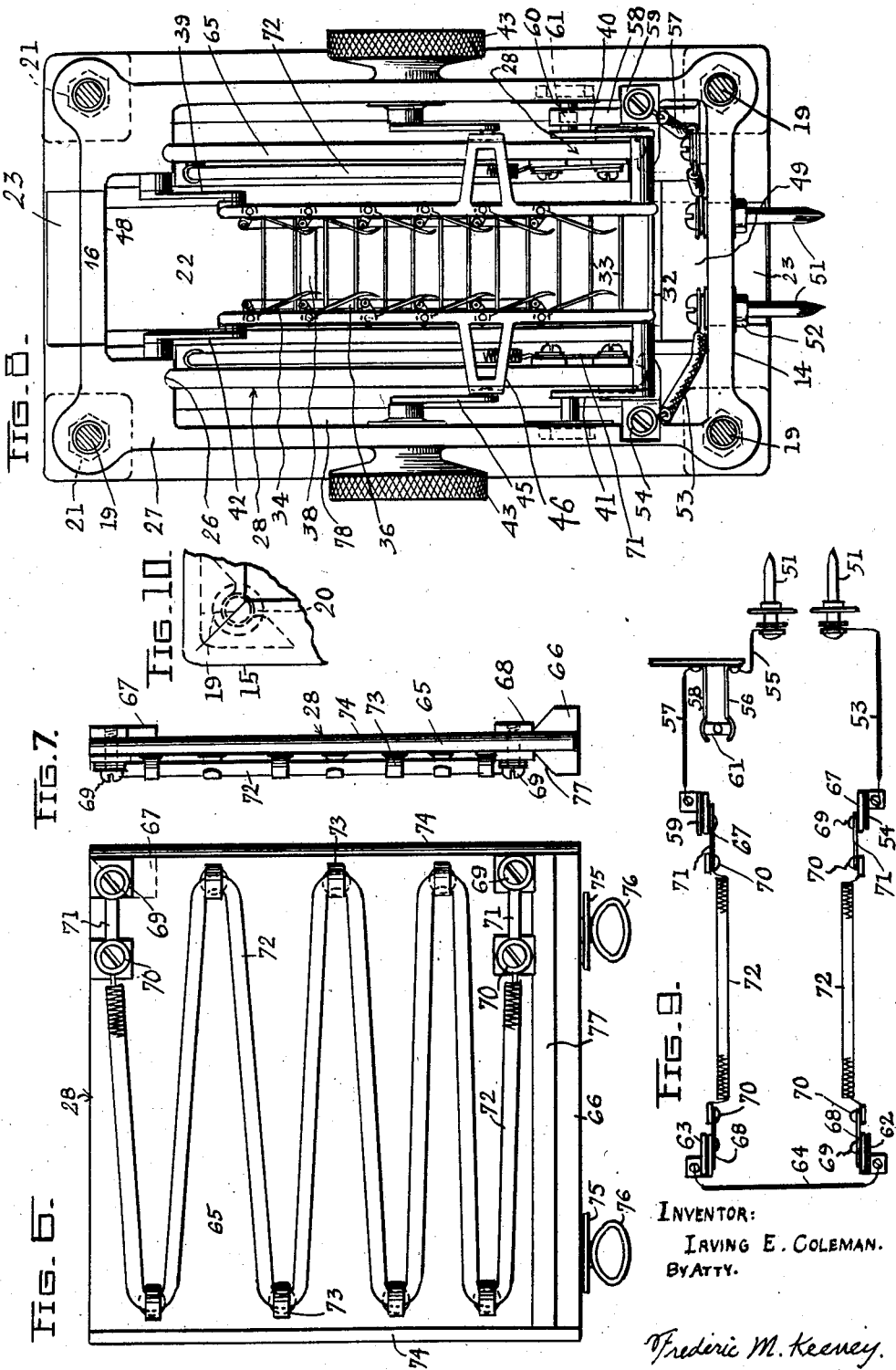
INVENTOR:
IRVING E. COLEMAN.
BY ATTY.
Frederic M. Keeney.

Patented Aug. 17, 1926.

1,596,080

UNITED STATES PATENT OFFICE.

IRVING E. COLEMAN, OF LOS ANGELES, CALIFORNIA.

ELECTRIC TOASTING DEVICE.

Application filed August 17, 1925. Serial No. 50,799.

The present invention is designed as an improvement on the electric toaster, shown and described in Letters Patent of the United States, No. 1,550,949, granted to me on the 25th day of August, 1925. In said Letters Patent, the toaster has a tiltable slice-holder, operated by a knob, and requiring an opening at the top through which the slice-holder projects for the reception of the article to be toasted.

An object of the present invention is to provide an oven toaster adapted to be moulded from insulating material, to provide a toaster housing having the switch box integral with the housing, to provide a housing having the opening for insertion of the slice, in the end wall of the housing, to provide a solid top for the oven or housing, and to provide a toaster in which the slice-holder and its operative mechanism remains within the limits of the housing in its toasting position and in its slice receiving position.

Another object is to provide mechanism whereby the current is shut off when the slice-holder is actuated to receiving position.

Another object of the invention is to arrange the heating devices with removable grids, whereby an unskilled person may readily remove and replace a burned out heating element.

Another object is to provide slice-holding mechanism whereby the slice is supported within the oven and spaced equidistant from the grid on either side so that the slice will be toasted evenly on all portions thereof, and whereby slices of varying thickness will all be similarly supported, and whereby the supporting elements will be actuated to a release position when the slice holder is actuated to its receiving position.

It is to be understood that the structural embodiment of the invention as a whole and its various features as shown, is merely illustrative and not restrictive as I am well aware that many of the details of construction can be widely varied without departing from the spirit of the invention. I therefore do not desire to be limited in these particulars or any others except as set forth in the appended claims.

Other advantages are to provide grids having a substantial base portion to avoid liability of cracking under heat and tensional strains, to provide fuse elements interposed between the heating elements and the switch elements and positioned on the detachable grids, and to provide means for retaining the grids within the housing without creating tensional strains therein.

Another object is to provide an integral crumb tray, and openings through which the crumbs may be removed.

In the drawings, Figure 1 is a transverse and sectional elevation of an electric toaster embodying the present invention, the section being taken generally on line $X^1$—$X^1$, of Fig. 2. Fig. 2 is a longitudinal and sectional elevation of the device. Fig. 3 is a fragmentary and detail view of the slice holder showing in plan, the toasting forks and their actuating means. Fig. 4 is a sectional detail view of a hand wheel and its lever arm, adapted for actuating the slice holder to receiving position and to toasting position. Fig. 5 is a perspective detail view of a contact member adapted to be mounted in the upper part of the device. Fig. 6 is a side elevation of a heating grid. Fig. 7 is an end elevation of the heating grid. Fig. 8 is a top plan view of the oven housing which has the detachable top removed, and shows the position of the bolts for attaching the top to the oven, and shows the abutments for supporting the grids. Fig. 9 is a wiring diagram showing the electrical elements and the electrical conductors. Fig. 10 is a fragmentary and plan view of the cover or top plate, showing the slots for the draw bolt in dotted lines.

In carrying out the present invention, the base 11, side walls 12, and end walls 13 and 14, form an integral oven housing which is provided with a detachable top plate 15. The integral body portion is made, preferably, from an insulating material or composition, of which there are many now on the market, and is molded to the desired form. The front wall 13, has an opening 16, in which the slice of bread to be toasted, is inserted. At the bottom, the housing is provided with latch-receiving recesses 17 and 18. Draw-bolts 19, engage with slots 20 in top plate 15, and extend through the housing, and are secured by nuts 21, at the bottom of the housing. The housing has an integral crumb tray 22, and openings 23, through which the crumbs may be removed. An opening 24, at the upper end of rear wall 14, and openings 25 at the top of the side walls, serve for ventilation, and, together with openings 23 and 16, provide for circulation of the air, tending to make the degree of heat more uniform in all parts of the housing. The body of the housing has interior grooves 26, in abutments 27, adapted to receive the grids 28, and the base portion 11 has openings 29, for inserting the grids within the housing.

The slice holder consists of a wire cage 30, having side frame members 31 connected by a wall member 32 at the back, and by cross-bars 33, at the bottom. Toasting forks 34, are journalled in frame members 31, and, at the bottom, are provided with short lever arms 35, connected, on either side, by a link 36. The slice-holder is adapted for movement to and from the opening 16, and, on approaching the limit of its movement in either direction, the projecting lugs 37, engage with a cross-bar 38, fixed to the housing. The movement of the slice-holder toward the opening 16 serves to force the toasting forks to their open position, and the contrary movement of the slice-holder to toasting position, serves to force the forks to their operative position, thereby to retain the slice of bread to be toasted, in a central position in the holder and spaced equally apart from the grids.

The slice-holder is actuated with an arcuate and reciprocatory movement. In receiving position, the slice-holder is flush with the front wall of the oven casing. In toasting position, the slice holder is within the casing and adjacent to the grids. Four lever arms 39, 40, 41 and 42, pivotally mounted relative to the housing, support the slice holder, and are adapted to swing through an arc of ninety degrees to actuate the holder to receiving and toasting positions. To actuate the slice holder, the hand wheels 43 are disposed on opposite sides of the housing, and mounted on shafts 44, journalled in the walls of the housing. Shafts 44, have integral lever arms 45 within the housing. Brackets 46, integral with the frame members 31, of the slice-holder, are pivotally connected at their extremities to lever arms 45. This arrangement permits of operating the slice holder from either side of the oven housing. The slice holder is limited in outward movement, by impinging on front wall portion 48, and in inward movement, by impinging on abutment 49, which has a hollow bore 50, for a purpose hereinafter set forth.

The three pairs of lever arms maintain the slice holder in position; and the pivotal connections afford ease of operation. The toasting forks swing inwardly only as the slice holder approaches its toasting position, and, owing to the lever arrangement, press very lightly on the slice of bread in the holder, and they serve to support the slice of bread so that all portions thereof, are equally spaced apart from the grids. The same light pressure is exerted equally on thick or thin slices of bread.

The plug terminals 51 mounted in and projecting from the rear wall 14, are held in place by external nuts 52. An insulated conductor 53, extends from one of terminals 51, to a contact plate 54, mounted at the top of the oven casing. An insulated conductor 55, extends from the opposite terminal 51, to the lower spring switch element 56, and conductor 57, from the upper spring switch element 58, to a contact plate 59, adjacent to the top of the oven casing. The supporting lever arm 40, for the slice-holder, has an integral pivot shaft 60, on which is mounted a switch element 61, adapted to engage with spring switch elements 56 and 58, when the slice-holder is in the toasting position, and thereby close the circuit between a terminal 51, and contact plate 59, on the corresponding side of the housing. Beneath contact plate 54, the contact plate 62 is positioned. A similar contact plate 63, is positioned beneath contact plate 59. An insulated conductor 64, extends through the hollow abutment 49, and in the bore 50, and connects the lowermost contact plates 62 and 63.

The grids 28, each consist of a plate 65, having its bottom edge 66, of enlarged section, and having an upper contact plate 67, and a lower contact plate 68. Binding post 69 are mounted on said contact plates 67 and 68. Other binding posts 70, are mounted on the carrying plate 65 and adjacent to binding posts 69; the fuse connectors 71 connecting binding posts 69 and 70. A heating conductor 72 is connected to binding posts 70, and is carried back and forth in loops over the supporting plate 65, being held thereon by hooks 73.

The grids 28 are inserted through openings 29, and are retained in position by the engagement of their edges 74, with grooves 26 in the oven casing, and by engagement of their enlarged base portions 66, with the longitudinal housing abutments 78. The spring latch members 75, engage with recesses 17 and 18, in the housing, to retain the grids in position. The knobs 76, by which the latch members are turned to operative and to inoperative positions, may further be used for removing the grids. The grids each have an inclined face 77, so that any crumbs falling thereon, are directed to the crumb tray portion 22.

In use, the terminals 51, are first connected to a source of electric current. The hand wheels are actuated to move the slice holder to its receiving position, and a slice of bread or other article to be toasted is inserted in the opening 16. A portion of the inserted slice, may be left protruding from the opening 16. The hand wheels 43 are then actuated a quarter of a turn, and the slice-holder thereby moved to its inner and toasting position. The protruding portion of the slice will be thereby carried within the housing. As the slice holder approaches its toasting position, the switch member 61 is turned to operative position, thereby energizing the heating conductors. As the slice-holder approaches its toasting position, the toasting forks 34 are forced inwardly and engage with the slice or article to be toasted and support it in a central position intermediate the grids, and parallel therewith. On turning the hand wheels 43 with a reverse motion, the slice holder is forced to its receiving position, the forks 34 are forced to inoperative position to release the article toasted, and the electric switch member 61 is turned to inoperative position.

What is claimed is:

1. In a toasting device having an oven housing, a slice holder operatively mounted in the housing and movable alternately to and from toasting and slice-receiving positions, toasting forks operatively mounted on the slice holder and adapted to swing inwardly and outwardly relative to the sides of the slice holder, a relatively short lever arm integral with each toasting fork, links beneath the slice holder and each link connecting the lever arms of the forks on a side of the slice holder, a stop bar fixed to the housing beneath the links, projecting lugs depending from the links and adapted to engage with the stop bar as the slice holder approaches its toasting and receiving positions, and actuating the forks inwardly as the slice holder approaches its toasting position, and outwardly as the slice holder approaches its receiving position, hand wheels for manually actuating the slice holder disposed on opposite sides of the housing, shafts for the hand wheels extending within the housing, lever arms fixed to the hand wheel shafts, brackets integral with the slice holder and pivotally connected to the lever arms on the hand wheel shafts, other supporting lever arms pivotally mounted within the housing and pivotally connected to the slice holder, electrical heating elements disposed within the housing and on opposite sides of the slice holder in its toasting position, and a switch member for the heating elements opened and closed by movement of a lever arm supporting the slice holder.

2. In a toasting device having an oven housing and a door in the front wall thereof, a slice holder operatively mounted in the housing and movable to and from the door, to slice-receiving position, and to toasting position, means for manually actuating the slice holder to its toasting and receiving positions, a portion of the front wall of the oven serving as an abutment to limit the movement of the slice holder to receiving position, an abutment in the rear of the oven limiting the movement of the slice holder to toasting position, toasting forks operatively mounted on the slice holder and adapted to swing inwardly to support the slice in a central position in the holder, means for actuating the toasting forks inwardly as the slice holder approaches its toasting position, means for actuating the toasting forks outwardly as the slice holder approaches its receiving position, electrical heating elements disposed within the oven and adjacent to the holder in its toasting position, electric terminals mounted on the rear wall of the oven, conductors connecting the terminals and the heating elements, and a switch interposed in one of the conductors and controlled by the movement of the slice holder.

3. In a toasting device, the combination with an oven housing, of removable and replaceable heating units therein comprising grid plates insertible through the base portion of the housing and extending along the side walls, an enlarged base portion on each grid plate, a longitudinal abutment on each side wall of the housing engaging with the base portion of a grid plate, latch members mounted on the base portion of each grid plate and engaging with the housing to support the grid plate in position against the corresponding longitudinal abutment, helical heating strands mounted on the grid plates, upper and lower contact members on each grid plate, fuse elements connecting each extremity of a heating strand with a contact member, upper contact plates mounted in the oven housing and adapted to engage with the uppermost contact members on the grid plates, lower contact plates mounted in the oven housing and adapted to engage with the lowermost contact members on the grid plates, a conductor connecting the lower contact plates in the oven housing, terminal plugs extending from the oven housing, electrical conductors connecting the terminal plugs with the uppermost contact plates, a switch interposed on one of the electrical conductors, said oven housing having a door for inserting and removing the material to be toasted, a slice holder operatively mounted in the housing and disposed between the grid plates, and movable to and from said door to toasting and receiving positions, and extending flush with the door in the receiving position, means for manually actuating the slice holder, and means whereby the switch is actuated to open position by movement of the slice holder to receiving position, and actuates the switch to closed position as the slice holder approaches the toasting position.

4. In a toasting device, an oven housing having a door in the front wall thereof, a slice holder operatively mounted in the housing and having an arcuate path of movement to and from said door, a series of lever arms supporting the slice holder and arranged in sets of three on a side, a wall abutment in the front door to limit the movement of the slice holder to receiving position, an abutment at the rear to limit the movement of the slice holder to toasting position, hand wheels, one on each side of the housing and operatively connected to actuate a corresponding supporting lever for the slice holder, electrical switch elements actuated by the movement of one of the supporting lever arms, heating elements controlled by said switch elements and disposed in parallelism with the slice holder, a conductor extending through the rear abutment in the housing and connecting the heating elements in series, terminal plugs mounted in the oven housing wall, and other conductors connecting the terminal plugs and heating elements with the switch elements.

5. In a toasting device, an oven housing molded from dielectric material, electrical elements mounted in and affixed to the housing, said electrical elements including upper and lower contact plates, and a switch, electric heating grids, insertible through the bottom of the housing, contact members on the grids and in contact with said contact plates, said housing having a door in the front wall thereof, a slice holder mounted in the housing and supported between the grids, means for actuating the slice holder to and from the door, and to respective receiving and toasting positions, means for manually actuating the slice holder, and means for automatically actuating the switch to open and to closed position in accordance with the position of the slice holder.

6. In a toasting device, an oven housing molded from dielectric material, and having a door in the front wall, a base portion including an integral crumb tray, and vertical and horizontal abutment walls, electrical elements mounted in and affixed to the housing and including upper and lower contact plates, and a switch, electric heating grids insertible through the base and maintained in position within the housing by the vertical and horizontal abutment walls, contact members on the heating grids and in contact with said contact plates, a slice holder within the housing and movable toward the door to a receiving position and from the door to a toasting position, means for manually actuating the slice holder to said positions, and means automatically operative whereby the switch is closed as the slice holder approaches its toasting position, and the switch is opened as the slice holder approaches its receiving position.

7. In a toasting device, an oven housing molded from dielectric material, and having a door in the front wall, a base portion including an integral crumb tray, vertical and horizontal abutment walls, and longitudinal apertures in the base adjacent to the crumb tray, and ventilation apertures at the top, electrical elements mounted and affixed to the inner walls of the housing and including upper and lower contact plates, and a switch, electric heating grids insertible through said longitudinal apertures in the base and supported within the housing by the vertical and horizontal abutment walls, contact members on the grids and in contact with the contact plates, helical heating strands mounted on the heating grids and in connection with the contact members, a slice holder within the housing and movable toward the door to receiving position and from the door to toasting position and positioned above the crumb tray, means for manually actuating the slice holder to said toasting and receiving positions, and means automatically operative whereby the switch is closed as the slice holder approaches toasting position and is opened as the slice holder approaches its receiving position.

8. In a toasting device, an oven housing, electric heating grids mounted in the housing, a slice holder working between the grids and having a receiving position and a toasting position, means for manually actuating the slice holder to said positions, means for automatically deenergizing the heating grids as the slice holder approaches its receiving position, spring toasting forks mounted on the slice holder and movable toward the center to properly support the thinner slices of material to be toasted equidistant from the grids, means for automatically actuating the toasting forks to their operative position as the slice holder approaches its toasting position, and to actuate the forks to inoperative position, on contrary movement of the holder.

9. In a toasting device, the combination with an oven housing molded from dielectric material and including a front wall, side walls, a rear wall and a base, longitudinal apertures in the base, a crumb tray integral with the base, vertical and longitudinal abutment walls within the housing, and ventilation apertures at the top of the housing, of a cover for the housing, draw bolts securing the cover to the housing, heating grids insertible through said longitudinal apertures in the base, and disposed within the housing, said front wall having a door, a slice holder mounted within the housing, and movable to and from the door and to a receiving position as it approaches the door and to a toasting position as it moves from the door, means exterior of the housing for actuating the slice holder, said slice holder remaining within the limits of the housing in its receiving position, means for automatically deenergizing the grids as the slice holder approaches its receiving position, and means automatically operative to center the slices of material to be toasted, as the slice holder approaches the toasting position, and to release the slices as the slice holder approaches its receiving position, said grids being supported in position by the vertical and longitudinal abutment walls, and on opposite sides of the slice holder, and said slice centering means supporting the slice equidistant from the grids.

10. In a toasting device, a housing having a door, electric heating grids within the housing, abutments in the housing to support the heating grids, latch elements carried by the grids and adapted to support the grids in engagement with said abutments, electrical elements within the housing and arranged for conducting an energizing current to the grids, a switch included in the said electrical elements, a slice holder operatively mounted within the housing and movable to receiving position and to toasting position, rock levers arranged on each side of the slice holder and arranged to support the holder centrally between the grids, means exterior of the housing and adapted to actuate certain of the rock levers, other abutments in the housing limiting the movement of the slice holder and serving to determine its receiving position and its toasting position, means for actuating said switch to open position as the slice holder approaches its receiving position and to actuate the switch to closed position as the slice holder approaches its toasting position, fork elements serving to support the slice to be toasted in a central position in the slice holder, and means for automatically actuating the fork elements to operative position as the slice holder approaches toasting position and for automatically actuating the fork elements to inoperative position as the slice holder approaches its receiving position.

In testimony whereof, I hereunto affix my signature.

IRVING E. COLEMAN.